US004001626B2

United States Statutory Invention Registration [19]

[11] Reg. Number: H1626

[45] Published: Jan. 7, 1997

Kersey et al.

[54] FIBER OPTIC NETWORK SYSTEM WITH LOW CROSSTALK USING CODE-DIVISION MULTIPLEXING

[76] Inventors: Alan D. Kersey, 9305 Silvercreek Ct., Fairfax Station, Va. 22039; Anthony Dandridge, 9514 Claychin Ct., Burke, Va. 22015

[21] Appl. No.: 10,252

[22] Filed: Jan. 28, 1993

[51] Int. Cl.[6] ..... H04J 13/02

[52] U.S. Cl. ..... 370/479; 359/135; 359/140; 380/34; 375/200

[58] Field of Search ..... 359/135, 140; 370/18; 375/1

[56] References Cited

U.S. PATENT DOCUMENTS

| | | | |
|---|---|---|---|
| 4,964,138 | 10/1990 | Nease et al. | 375/1 |
| 5,022,047 | 6/1991 | Dixon et al. | 375/1 |
| 5,081,643 | 1/1992 | Schilling | 375/1 |
| 5,144,640 | 9/1992 | Yamamoto | 375/1 |
| 5,216,693 | 6/1993 | Nakamura | 375/1 |

OTHER PUBLICATIONS

Sakai et al., "Multiplexing of Optical Fiber Sensors Using a Frequency–Modulated Source and Gated Output", Journal of Light Wave Tech., vol. LT–5, No. 7, Jul. 1987, pp. 932–940.

Al–Raweshidy et al., "Hybrid Optical Spectral and time division multiplexing for passive interferometric fibre optic sensors network," Optics communication, vol. 95 No. 4–6, pp. 239–245, 15 Jan. 1993.

Holmes et al., "Multiplexing Optical Sensors using a spatial light modulator," Proceedings of the SPIE–vol. 1797, 1993, pp. 210–217.

(List continued on next page.)

*Primary Examiner*—Bernarr E. Gregory

[57] ABSTRACT

A code-division multiplexed system comprising an optical source, a code generator for developing and applying a pseudo-random bit sequence code to the optical source to cause the optical source to develop a unipolar coded optical signal, a means for dividing the unipolar coded optical signal into N optical paths separated from each other by associated successive integer multiples of a bit period T of delay, N information signal sources responsive to the unipolar coded optical signals for selectively producing N differently-delayed optical information signals, a means for combining the N differently-delayed optical information signals into an output optical signal comprised of an intensity sum of the overlapping N differently-delayed optical unipolar information signals, a photodetector responsive to the output optical signal for developing an input electrical signal corresponding to the sum of N overlapping unipolar optical signals, an adjustable delay circuit responsive to the pseudo-random bit sequence code for producing a desired bipolar reference code corresponding to the delay associated with an associated desired one of the N differently-delayed optical information signals, and a correlation circuit responsive to the input electrical signal and to the desired bipolar reference code for synchronously correlating the desired bipolar reference code with the input electrical signal to extract a desired electrical signal corresponding to the desired one of the N differently-delayed optical information signals and to substantially suppress any other electrical signal that is asynchronously aligned with the desired bipolar reference code.

8 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Prucnal et al., "Spread Spectrum Fiber–Optic Local Area Network Using Optical Processing", Journal of Lightwave Tech., vol. LT–4, No. 5, May 1986, pp. 547–554.

Everard, "Novel Signal Processing Techniques For Enhanced OTDR Sensors" SPIE, vol. 798, FiberOptic Sensors II, 31 Mar.–3 Apr. 1987, pp. 42–46.

Al–Raweshidy et al., "Spread Spectrum Technique For Passive Multiplexing of Interferometric Optical Fibre Sensors", SPIE, vol. 1314, Fibre Optics '90, 24–26 Apr. 1990, pp. 342–347.

Kersey et al., "Phase–Noise Reduction in Coherence–Multiplexed Interferometric Fibre Sensors", Electronics Letters, vol. 22, No. 11, 22 May 1986, pp. 616–618.

Kersey et al., "Multiplexed Mach–Zehnder Ladder Array With Ten Sensor Elements", Electronics Letters, vol. 25, No. 19,14 Sep. 1989, pp. 1298–1299.

FIBER OPTIC NETWORK SYSTEM WITH LOW CROSSTALK USING CODE-DIVISION MULTIPLEXING

BACKGROUND OF THE INVENTION

1. Field of the Invention

The present invention relates to fiber optic sensors and particularly to the multiplexing of interferometric sensors using a fiber optic ladder or star configuration of interferometric sensors and code division multiplexing to produce low crosstalk between sensors.

2. Description of the Related Art

Spread spectrum (SS) and code division multiplexed (CDM) techniques have been applied to a variety of communications applications, including optical fiber systems. This type of signal processing has also been previously investigated for optical time-domain reflectometry (OTDR) based sensing and, more recently, has been proposed and tested as a means for multiplexing interferometric sensors. In this work, the interrogating laser source is modulated using a pseudo-random bit sequence (PRBS) of length $2^m-1$ (maximal length sequence or m-sequence), and correlation is used to provide synchronous detection to identify specific sensor positions. A delay equal to an integer multiple of the bit (or 'chip') period separates the sensors. The received signals from the array are then encoded by delayed versions of the PRBS, and correlation techniques can be used to extract the individual signals. Although this technique may provide advantages in terms of power budget for time-division multiplexed systems, prior work in this area has been limited by excess phase noise effects arising due to mixing of time coincident pulses from different sensors and by relatively high crosstalk between sensors.

SUMMARY OF THE INVENTION

Accordingly, one object of the invention is to provide a fiber optic network system with low crosstalk between channels of the network by using spread spectrum and code-division multiplexing techniques.

Another object of the invention is to provide a fiber optic ladder or star network system with low crosstalk between channels of the network by using spread spectrum and code-division multiplexing techniques.

Another object of the invention is to provide an array of interferometric sensors using a fiber optic ladder or star configuration of interferometric fiber optic sensors and spread system and code-division multiplexing techniques to produce low crosstalk between sensors.

A further object of the invention is to provide a fiber optic network system which utilizes spread spectrum and code-division multiplexing techniques to accomplish better suppression of unwanted signals with a shorter code sequence length.

In the present invention, a code-division multiplexed system is disclosed. In a preferred embodiment of the invention, the system comprises an optical source, a code generator for developing and applying a pseudo-random bit sequence code (a maximal length sequence or m-sequence) to the optical source to cause the optical source to develop a unipolar coded optical signal, a means for dividing the unipolar coded optical signal into N optical paths separated from each other by associated successive integer multiples of a bit period T of delay, N information signal sources for selectively encoding the unipolar coded optical signals in the respective N optical paths for producing N differently-delayed optical information signals, a means for combining the N differently-delayed optical information signals into an output optical signal comprised of an intensity sum of the overlapping N differently-delayed optical unipolar information signals, a photodetector responsive to the output optical signal for developing an input electrical signal corresponding to the sum of N overlapping unipolar optical signals, an adjustable delay circuit responsive to the pseudo-random bit sequence code for producing a desired bipolar reference code corresponding to the delay associated with an associated desired one of the N differently-delayed optical information signals, and a correlation circuit responsive to the input electrical signal and to the desired bipolar reference code for synchronously correlating the desired bipolar reference code with the input electrical signal to extract a desired electrical signal corresponding to the desired one of the N differently-delayed optical information signals and to substantially suppress any other electrical signal that is asynchronously aligned with the desired bipolar reference code.

BRIEF DESCRIPTION OF THE DRAWINGS

These and other objects, features and advantages of the invention, as well as the invention itself, will become better understood by reference to the following description when considered in connection with the accompanying drawings wherein like reference numerals designate identical or corresponding parts throughout the several views and wherein.

DETAILED DESCRIPTION

Figure 1:
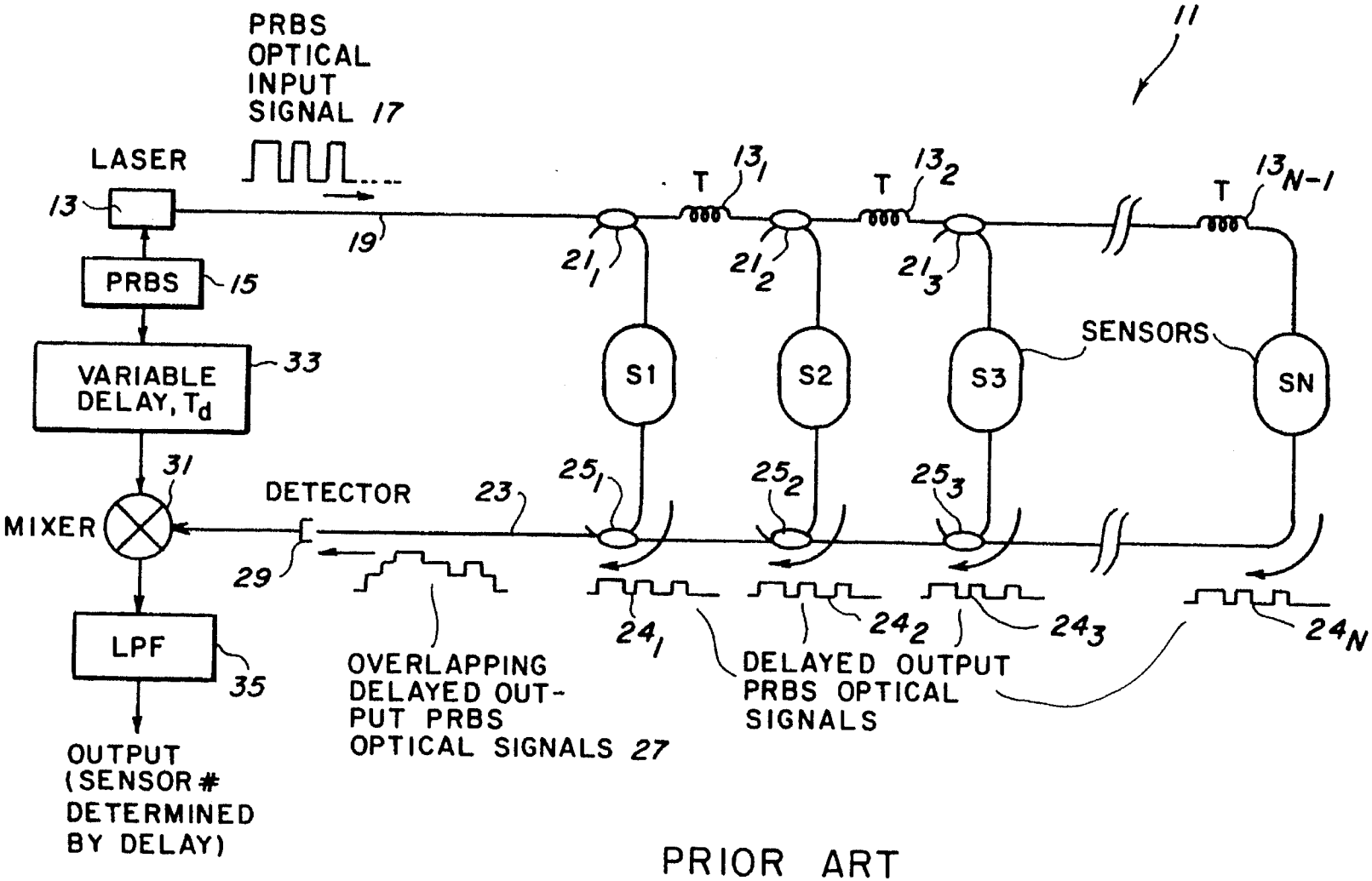
PRIOR ART FIG. 1
FIG. 1 is a schematic diagram of a typical prior art fiber optic sensor array system using code-division multiplexing.

Referring now to the drawings, FIG. 1 illustrates a prior art fiber optic sensor array which utilizes code-division multiplexing. More specifically, FIG. 1 illustrates the principle of operation of the code-division multiplexed (CDM) approach applied to an interferometric sensor ladder-type array 11.

The interferometric sensor ladder-type array 11 is comprised of N sensors, S1-SN, respectively separated from each other by N-1 delay coils $\mathbf{13}_1$, $\mathbf{13}_2$—$\mathbf{13}_{n-1}$, each delay coil having a delay which corresponds to an integer (greater than 0) number of the bit period T. In the exemplary case shown, each delay corresponds to one bit period T.

Light from a laser 13 is intensity modulated by a pseudo-random bit sequence (PRBS) code of length $2^m-1$ (maximal length sequence or m-sequence) from a PRBS code generator 15 to produce a PRBS optical signal 17. The PRBS code generator 15 can be implemented with a shift register (not shown) which has it output coupled back to its input to continuously circulate a PRBS code therethrough. The PRBS code can be applied directly to the laser 13 or it can be applied to a modulator (not shown) which follows the laser 13 to intensity modulate the output of the laser 13.

The PRBS optical signal 17 is launched into an input optical fiber 19 that is optically coupled to the array 11. Portions of the PRBS optical signal 17 are fed into the sensors S1–SN by way of associated fiber optic couplers $\mathbf{21}_1$, $\mathbf{21}_2$, $\mathbf{21}_3$ to $\mathbf{21}_{n-1}$ (not shown) in the array 11, with each of the portions (except the portion into sensor S1) being delayed at the inputs to the sensors S2-SN by the delay time T of each of the delay coils $\mathbf{13}_1$–$\mathbf{13}_{n-1}$ between the respective sensors S1-SN. In other words, the portions of the PRBS optical signal that are fed to the sensors S1-SN are each delayed by a multiple. $n_j$, of the bit period T, where j denotes a specific sensor ($1 \leqq j \leqq N$). The sensors S1-SN monitor environmental conditions or physical phenomena (such as changes in temperature, pressure, electromagnetic fields and acoustical waves) which selectively produce changes in the phases of the respective portions of the PRBS optical signal 17 traveling through the sensors S1–SN.

The delayed output PRBS optical signals $\mathbf{24}_1$–$\mathbf{24}_N$ from the sensors S1-SN are thus overmodulated by the sensor signals, with each signal output being delayed with respect to each other by a time T (which is due the delay coils $\mathbf{13}_1$–$\mathbf{13}_{N-1}$). The delayed output PRBS optical signals from the sensors S1-SN are fed into an output optical fiber 23 by way of respective fiber optic couplers $\mathbf{25}_1$, $\mathbf{25}_2$, $\mathbf{25}_3$ to $\mathbf{25}_{N-1}$ (not shown) in the array 11. In the output optical fiber 23, the resultant series of delayed output PRBS optical signals combine and overlap with each other to produce a total output optical signal 27, which is comprised of the intensity sum of the overlapping delayed output PRBS optical signals. Each PRBS optical signal is a delayed PRBS sequence which is modified by the appropriate transfer function of its associated one of the sensors S1-SN. As a result, the total output optical signal 27 is a complex up-down staircase-like function.

The total output optical signal 27 is applied to an optical detector 29 to develop an electrical signal which is an electrical representation of the total output optical signal 27. As a result, this electrical signal appears as a noise signal because it contains multiple overlapping electrical components representative of the optical signals from the different sensors S1-SN. Basically, the electrical signal looks like an up-down staircase of pulses.

The electrical signal at the output of the detector 29 can be decoded using synchronous correlation-detection involving multiplication of the electrical signal with an appropriately delayed reference PRBS. This operation will now be described.

The electrical signal developed by the detector 29 is applied to a mixer 31 which also receives an appropriately delayed pseudo-randon bit sequence code from an adjustable delay circuit 33. The adjustable delay circuit 33 can be implemented as a tapped shift register with N taps representative of the delays respectively corresponding to the N delays associated with the N sensors S1–SN. The delay circuit 33 is responsive to the pseudo-random bit sequence code from the PRBS code generator 15 for producing the same pseudo-random bit sequence code at its output, but after a time delay NT, where T is the normal delay of each of the delay coils $\mathbf{13}_1$–$\mathbf{13}_{N-1}$, and N is the delay times of T to identify the particular one of the sensors S1–SN that is to be interrogated. For example, if sensor S3 is to be interrogated, the tap of the adjustable delay circuit 33 that produced a PRBS code having a delay of 2T would be selected to produce a reference delayed PRBS code having the same amount of delay as that presented to the PRBS optical signal that is applied to sensor S3.

It should be noted at this time that the input and output optical fibers 19 and 23 also present delays. However, since the type and lengths of the fibers 19 and 23 would be known, the total amount of delay due to the fibers 19 and 23 could be provided for in the adjustable delay circuit 33, or by adding additional delay circuits.

The mixer 31 mixes the appropriatly-delayed reference pseudo-random bit sequence from the adjustable delay circuit 33 with the composite electrical signal from the detector 29. If, for example, the delay of the adjustable delay circuit 33 is adjusted such that it matches exactly the delay experienced by the signal from sensor S3, then the reference pseudo-random bit sequence from the delay circuit 33 will be aligned in time with the signal which arrived from sensor $3. When these two signals are aligned, the mixer 31 will synchronously detect the desired output signal from sensor $3. The signals from the remaining ones of the sensors S1-SN will be multiplied by an asynchronous version of the delayed pseudo-random bit sequence from the delay circuit 33, will be further decorrelated or spread out, and will just appear as background noise signals.

The output of the mixer 31 is passed through a low pass filter (LPF) 35 to develop an electrical signal output representative of the output of the particular one of the sensors S1-SN that was determined by the delay of the delay circuit 33.

Thus, the electrical signal at the output of the detector 29 was decoded by using synchronous correlation-detection involving multiplication of the electrical signal from the detector 29 with an appropriately delayed reference pseudo-random bit sequence.

The prior art technique shown in FIG. 1 of just using an RF mixer 31 to multiply the electrical signal from the detector 29 with the delayed pseudo-random bit sequence from the adjustable delay circuit 33 produces crosstalk between the signals from the sensors S1–SN. To illustrate this problem, assume that the delay of the adjustable delay circuit 33 is set so as to interrogate the output signal of sensor $3 and to thus synchronously detect that sensor signal. However, the output of the filter 35 will not only contain the desired output signal of sensor S3, but will also contain the output signals of the other ones of the sensors S1–SN, but at a much lower signal level. This crosstalk among the sensors S1–SN arises because of the finite length of the pseudo-randon bit sequence from the PRBS generator 15. The length of the pseudo-random bit sequence is given by $2^m$31 1. Thus, when m=5, a bit sequence of 31 is obtained. A bit sequence length of 31 will produce a suppression ratio between a desired sensor signal and the other sensor signals of 31 to 1. In other words, a 31 to 1 signal-to-background suppression is obtained. So the unwanted signals can only be suppressed by an amount proportional to the length of the pseudo random bit sequence code. Therefore, the longer the code, the better the suppression that can be obtained. Therefore, to eliminate that crosstalk, very long code lengths, such as 100 bits, would have to be used. However, the longer the code length that is used, the lower the bandwidth of the system, because the highest frequency that can be detected by the system of FIG. 1 is determined by the length of the code that is used.

In spread-spectrum communications systems, this synchronous detection, or de-spreading process, decodes the information channel of interest while spreading any interfering signal occupying the same frequency spectrum. The amplitude suppression ratio of an interfering signal relative to a coded information signal is given by the following Equation (1).

$$R=-20\log_{10}[2^m-1]\ (\text{dB}) \tag{1}$$

In spread spectrum communications systems, this property is used to discriminate between the wanted coded signal and any incoded 'interfering' signals. However, in the case of a sensor array, all signals received are coded but with different relative delays.

Normally. in imvestigating the correlation functions of noise-like codes, bipolar digital states (+1,−1) are of interest. The auto-correlation functions of m-sequence codes are characterized by peaks at $\gamma=0, \pm kT[2^m-1]$ (k-integer) of height=$(2^m-1)$ and width T on a baseline of −1.

Figure 2:
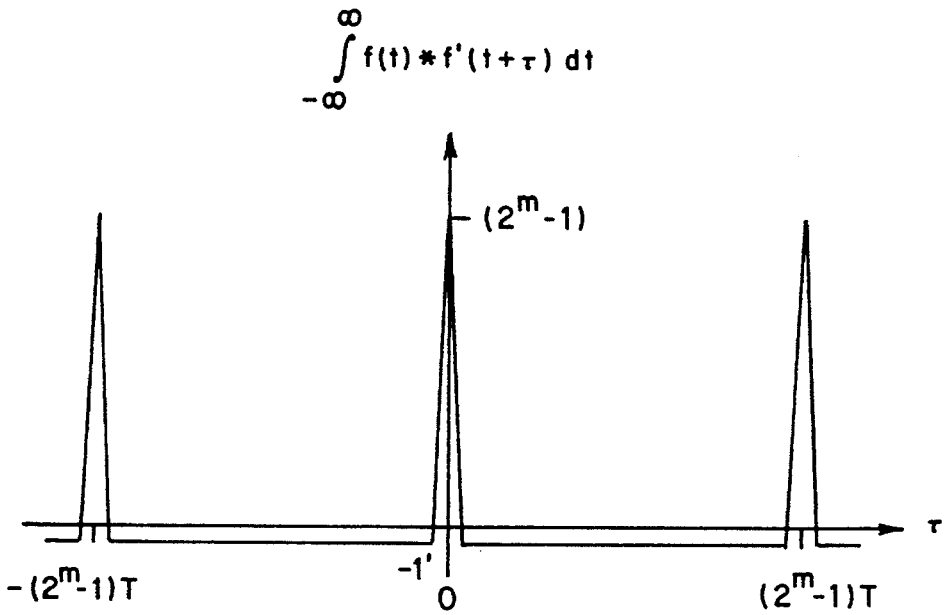
PRIOR ART FIG. 2
FIG. 2 illustrates a prior art auto-correlation function for a bipolar m-sequence pseudo-random code typically used in the prior art system of FIG. 1.

FIG. 2 illustrates the prior art, auto-correlation function for a bipolar m-sequence code. In the operation of the multiplexed sensor system of FIG. 1, however, the optical power coupled to the array 11, is switched on and off according to the m-sequence code, which represents a unipolar code, f(t)=1, 1, 0, . . . sequence. If the detected optical signal is gated or multiplied by a bipolar sequence; $f'(t+\gamma)=+1, +1, -1, \ldots$, the correlation function of interest is the modified auto-correlation:

$$\Psi(\tau)=\int_{-\infty}^{\infty} f(t)*f'(t+\tau)dt \tag{2}$$

where:

f is the unipolar function itself f' is a delayed bipolar version of the function f t represents time $\gamma$ represents a delay between the two functions f and f'

Thus, if $\gamma$, the delay between the functions f and f', is zero then the functions f and f' are identical.

For m-sequences, this correlation function has peaks at $\gamma=0, \pm kT[2^m-1]$ (k-integer) of height=$(2^m-1)$ and width T on a zero baseline. Consequently, the correlation function is zero for any asynchronous alignment of the codes. This occurs because any m-sequence code contains $2^{(m-1)}$ 'ones' and $(2^{(m-1)}-1)$ 'zeros' (corresponding to +1 and −1 digital states in the bipolar code f'(t)).

Figure 3A:
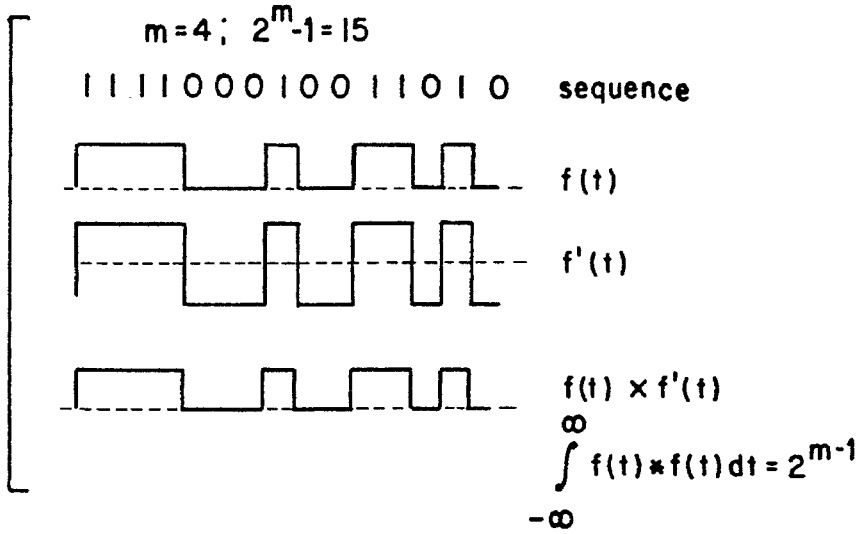
FIGS. 3A–3C illustrates three exemplary sets of unipolar and bipolar code alignments for three different delays to aid in understanding the operation of the present invention.
Figure 3B:
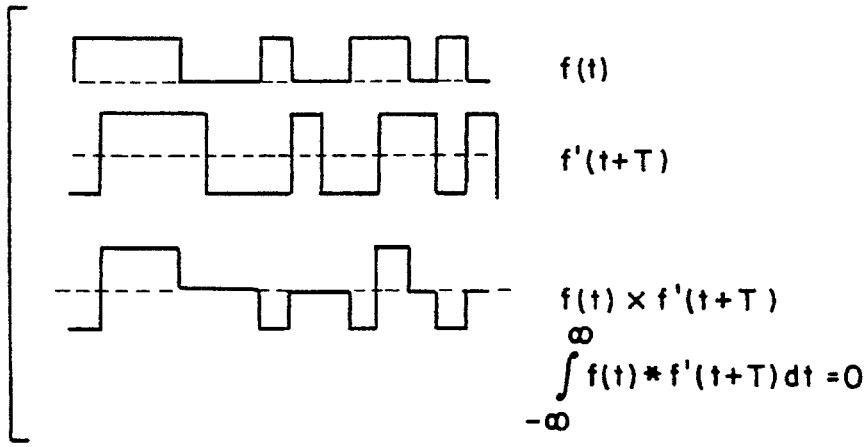
Figure 3C:
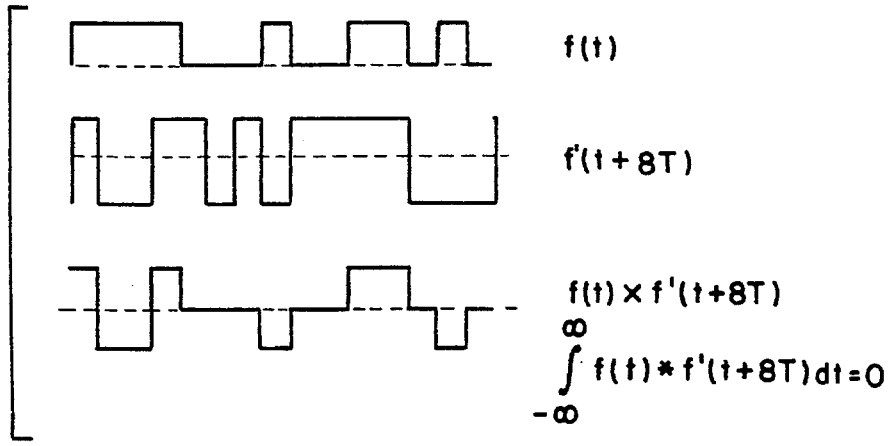

FIG. 3 is comprised of FIGS. 3A, 3B and 3C which respectively illustrate three exemplary sets of unipolar and bipolar code alignments for three different delays between f(t) and f'(t) to aid in understanding the operation of the present invention (to be discussed). It should be noted, as is shown in FIGS. 3A, 3B and 3C, that the sequence f(t) is a unipolar code sequence, and that that each of the exemplary sequences f'(t), f'(t+T) and f'(t+8T) is a bipolar code sequence. Also note that the bipolar codes f'(t), f'(t+T) and f'(t+8T) have the same code as f(t), that in FIG. 3A the bipolar code f'(t) is synchronized with the unipolar code f(t), that in FIG. 3B the bipolar code f'(t+T) is delayed from the unipolar code f(t) by one bit period (T), and that in FIG. 3C the bipolar code f'(t+T) is delayed from the unipolar code f(t) by 8 bit periods (8T).

As shown in FIG. 3A, when the code f(t) is synchronized with the code f'(t), all of the 'ones' in the unipolar code f(t) align with the +1 states in the bipolar code f'(t), whereas the 'zeros' in f(t) align with the −1 states in f'(t). This produces a correlation peak of height $2^{(m-1)}$.

As shown in each of FIGS. 3B and 3C, however, for any asynchronous alignment of the bipolar code f' with the unipolar code f(t), half the 'ones' in the unipolar code f(t) align with +1 states in the bipolar code f' whereas the other half of the 'ones' in the unipolar code f(t) align with the −1 states in the bipolar code f'. This produces a correlation value of zero.

Figure 4:
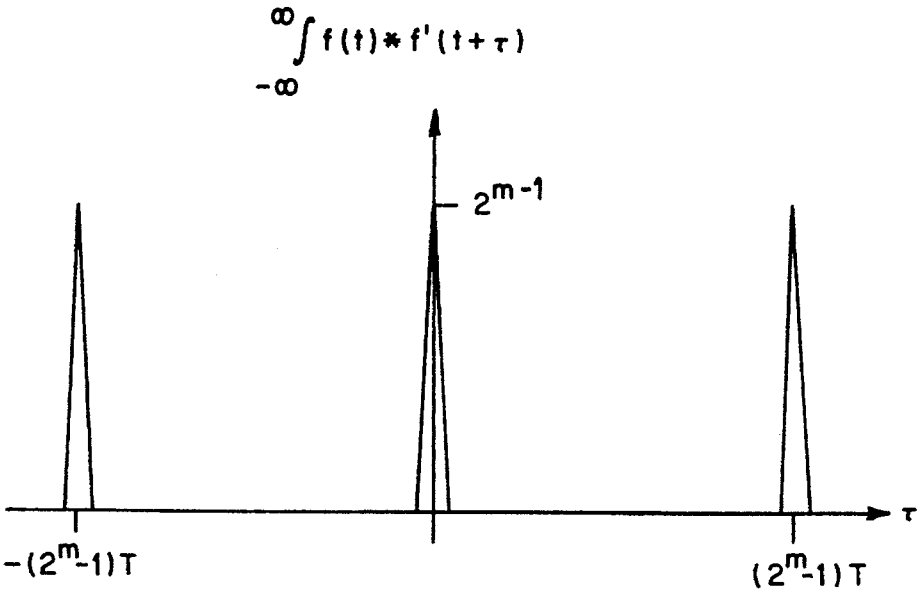
FIG. 4 illustrates the modified auto-correlation function used in the operation of the present invention.

Thus, the form of the modified auto-correlation function obtained is shown in FIG. 4. This zero correlation value always holds for any asynchronous alignment of the unipolar f(t) code with the bipolar f'(t) code, and thus ensures that delayed coded signals can be rejected with high isolation. In a multiplexed system, this property can be used to provide good isolation between sensors, providing that the code length is equal to or greater than the number of sensors in the array; i.e. $(2^m-1)\geqq N$.

Figure 5:
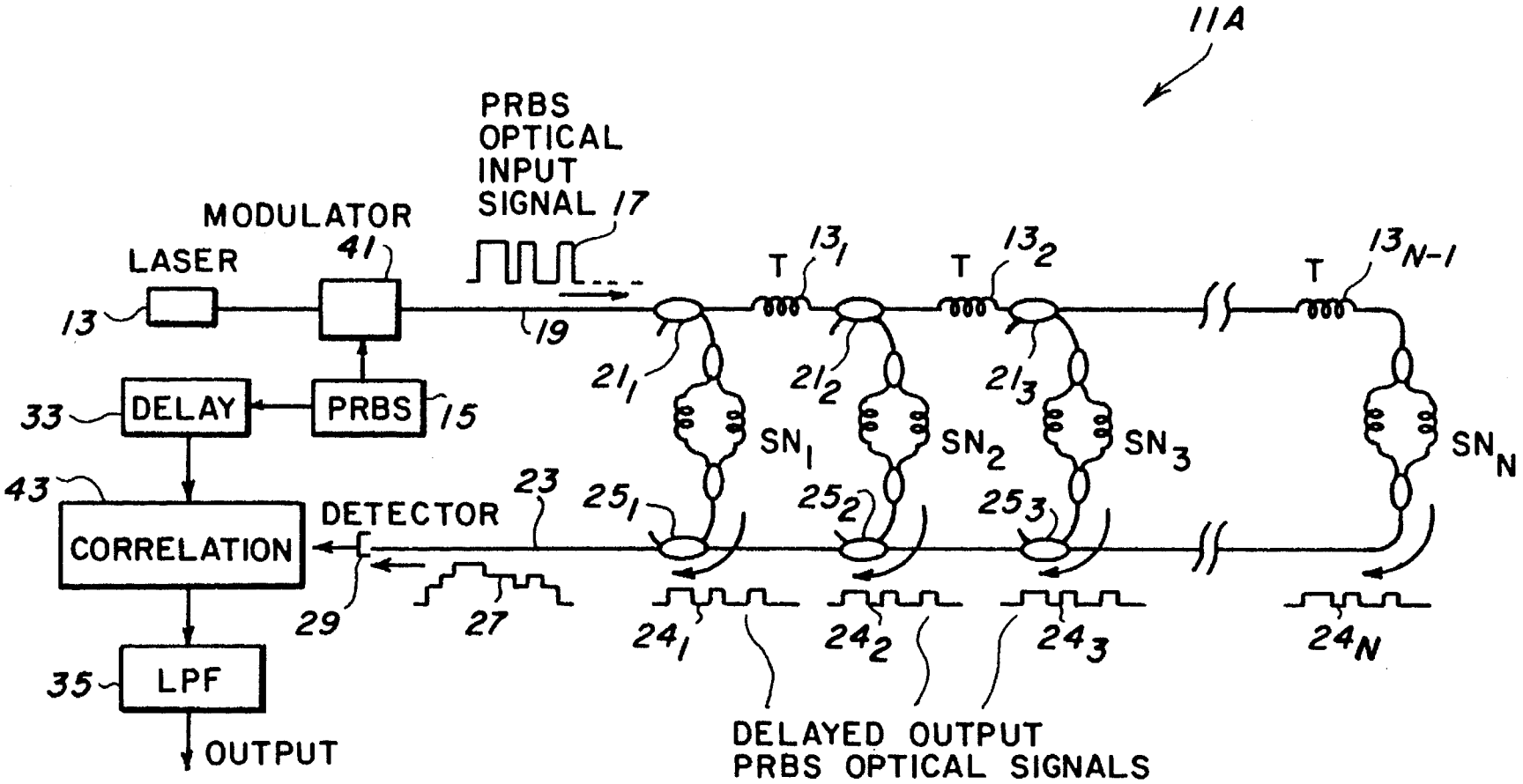
FIG. 5 illustrates a first embodiment of the invention.

Referring to FIG. 5, a first embodiment of the invention will now be discussed. FIG. 5 illustrates an exemplary interferometric fiber optic sensor array 11A using a ladder arrangement of sensors $SN_1$,$SN_2$, $SN_3$–$SN_N$. It should be understood that any other suitable arrangement of sensors, such as a star arrangement, would also be applicable. In a star arrangement, the sensors would fan out from a central distribution point.

The circuitry of FIG. 5 is substantially similar to the circuitry of FIG. 1 in structure and function, except for the following differences. An intensity modulator 41 is optically coupled to the laser 13 and inserted between the laser 13 and the input optical fiber 19. The PRBS code generator 15 is coupled to the modulator 41 instead of to the laser 13 (as is shown in FIG. 1). The radio frequency (RF) mixer 31 of FIG. 1 is replaced with a correlation circuit 43. As will be explained, these structural differences in FIG. 5 will produces operational differences which will enable the system of FIG. 5 to operate with a much better suppression of unwanted signals and therefore produce very low crosstalk between sensors.

In operation, the optical signal from the laser 13 is applied to the intensity modulator 41. The pseudo-random bit sequence (PRBS) code of length $2^m-1$ (maximal length sequence or m-sequence) is also applied to the modulator 41 to modulate the optical signal with an on-off pattern. This modulation of the optical signal by the PRBS code turns the light on and off which produces, at the output of the modulator 41, a unipolar pseudo-random bit sequence optical signal 17 which is transmitted through the input optical fiber 19 to all of the different sensors $SN_1$,$SN_2$, $SN_3$–$SN_N$ by way of the associated fiber optic couplers $\mathbf{21}_1$, $\mathbf{21}_2$, $\mathbf{21}_3$ to $\mathbf{21}_{n-1}$(not shown) and the associated delay coils $\mathbf{13}_1$, $\mathbf{13}_2$—$\mathbf{13}_{N-1}$ (which are respectively coupled between associated pairs of the couplers $\mathbf{21}_1$, $\mathbf{21}_2$, $\mathbf{21}_3$ to $\mathbf{21}_{N-1}$).

The delayed output PRBS optical signals $\mathbf{24}_1$, $\mathbf{24}_2$, $\mathbf{24}_3$–$\mathbf{24}_N$ from the respective sensors $SN_1$,$SN_2$, $SN_3$–$SN_N$, pass through the associated fiber optic couplers $\mathbf{25}_1$, $\mathbf{25}_2$, $\mathbf{25}_3$ to $\mathbf{25}_{N-1}$ into the output optical fiber 23. In the output optical fiber 23, the resultant series of delayed output PRBS optical signals combine and overlap with each other to produce a total output optical signal 27, which is comprised of the intensity sum of the overlapping delayed output PRBS optical signals. Each PRBS optical signal is a delayed PRBS sequence which is modified by the appropriate transfer function of its associated one of the sensors S1–SN. As a result, the total output optical signal 27 is a complex up-down staircase-like function.

The total output optical signal 27 is applied to an optical detector 29 to develop an electrical signal which is an electrical representation of the total output optical signal 27. As a result, this electrical signal appears as a noise signal because it contains multiple overlapping electrical components representative of the optical signals from the different sensors S1–SN. Basically, the electrical signal looks like an up-down staircase of pulses.

The electrical signal at the output of the detector 29 is then applied to a correlation circuit 43 for correlation with an appropriately delayed reference PRBS. The output of the correlation circuit 43 is then filtered by the low pass filter 35 to produce the desird sensor signal outpu. The major difference between the operation of the system of FIG. 5 and that of FIG. 1 lies in the operation of the correlation circuit 43.

It should be noted at this time that system of FIG. 5 could have used intensity-based sensors instead of the interferometric sensors shown, and the system would have worked equally well with such intensity-based sensors.

Figure 6A:
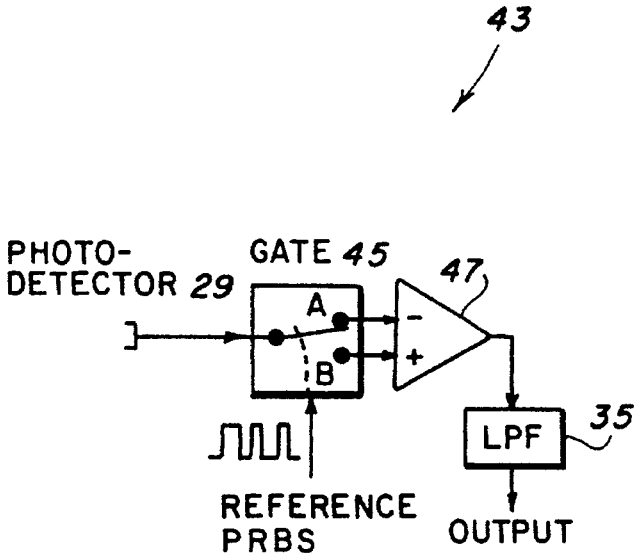
FIG. 6A illustrates a first type of correlation circuit that can be utilized in the invention.

A first embodiment of the electronic correlation circuit 43 that is used to perform the correlation operation in FIG. 5 is shown in FIG. 6A, which will now be discussed. As shown in FIG. 6A, the electrical signal from the photodetector 29 is coupled to a gate 45, which is basically an electrical analog switch which has two pole positions, terminal A and terminal B. The reference delayed PRBS code signal from the adjustable delay circuit 33 operates as a switching signal. This reference PRBS signal, which may be a unipolar or a bipolar signal, is applied to the gate 45 to cause the gate to switch to terminal A or terminal B. Terminals A and B are respectively connected to the negative (–) and positive (+) inputs of a difference amplifier 47.

The combination of the dual pole gate 45 and the difference amplifier 47 basically operates on the electrical signal from the photodetector 29 with a bipolar operation. In other words, the output of the difference amplifier 47 is sequentially inverted or non-inverted by the application of the reference PRBS code signal. Examples of the operation of the correlation circuit 45 can be readily seen by referring back to FIGS. 3A, 3B and 3C.

The correlation circuit 45 performs the function of taking the intensity sum of the combination of the unipolar signals (the electrical signal) from the photodetector 29 and correlating or multiplying those signals by a delayed bipolar version of the same code the reference PRBS signal. That code is delayed in the delay circuit 33 by a preselected delay. It is the delay in that code which determines which sensor channel in FIG. 5 (or which communications channel in FIG. 7) that is being interrogated. The output of the difference amplifier 47 is filtered by the low pass filter 35 to remove the switching signals and its output is just the selected sensor information of interest in FIG. 5 (or the selected communications channel information of interest in FIG. 7). Thus, the gate 45 and difference amplifier 47 in FIG. 6A perform this bipolar modulation of the electrical signal from detector 29

The selection of the gate circuit 45 is basically determined by the bit rate of the pseudo-random bit sequence. If the repetition rate of the pseudo-random bit sequence is about one megahertz (MHz) or so, then the gate that can be used in FIG. 6A would preferrably be a CMOS type gate. For higher frequencies, when the bit period approaches naoseconds (nsec) or faster, a gate with a faster switching time would be needed. An exemplary gallium arsenide semiconductor switch, which performs switching functions at very high rates, would preferrably be used as the gate 45 in FIG. 6A.

Figure 6B:
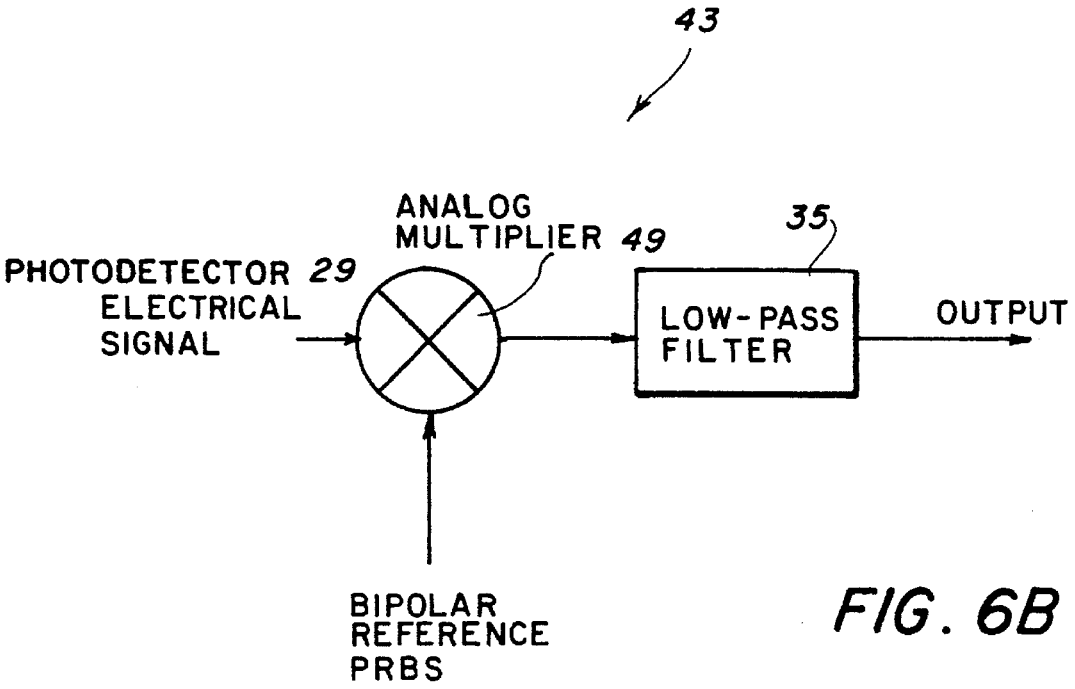
FIG. 6B illustrates a second type of correlation circuit that can be utilized in the invention.

A second embodiment of the electronic correlation circuit 43 that is used to perform the correlation operation in FIG. 5 is shown in FIG. 6BA, which will now be discussed.

It was shown in FIG. 6A that the combination of the gate 45 and difference amplifier 47 perform a bipolar modulation of the electrical signal from detector 29. As shown in FIG. 6B. this operation can be directly accomplished by DC coupling the electrical signal from the photodetector 29 into an analog multiplier 49, which is in turn driven by a bipolar reference PRBS code. This bipolar reference PRBS code, which has to be a symmetrical code, is also DC coupled into the analog multiplier 49. In other words, the bipolar reference PRBS code has to have positive and negative voltages that are precisely equal to each other in amplitude but opposite in polarity. For example, the bipolar reference PRBS code must precisely go from +1V to −1V or from +10V to −10V.

Figure 7:
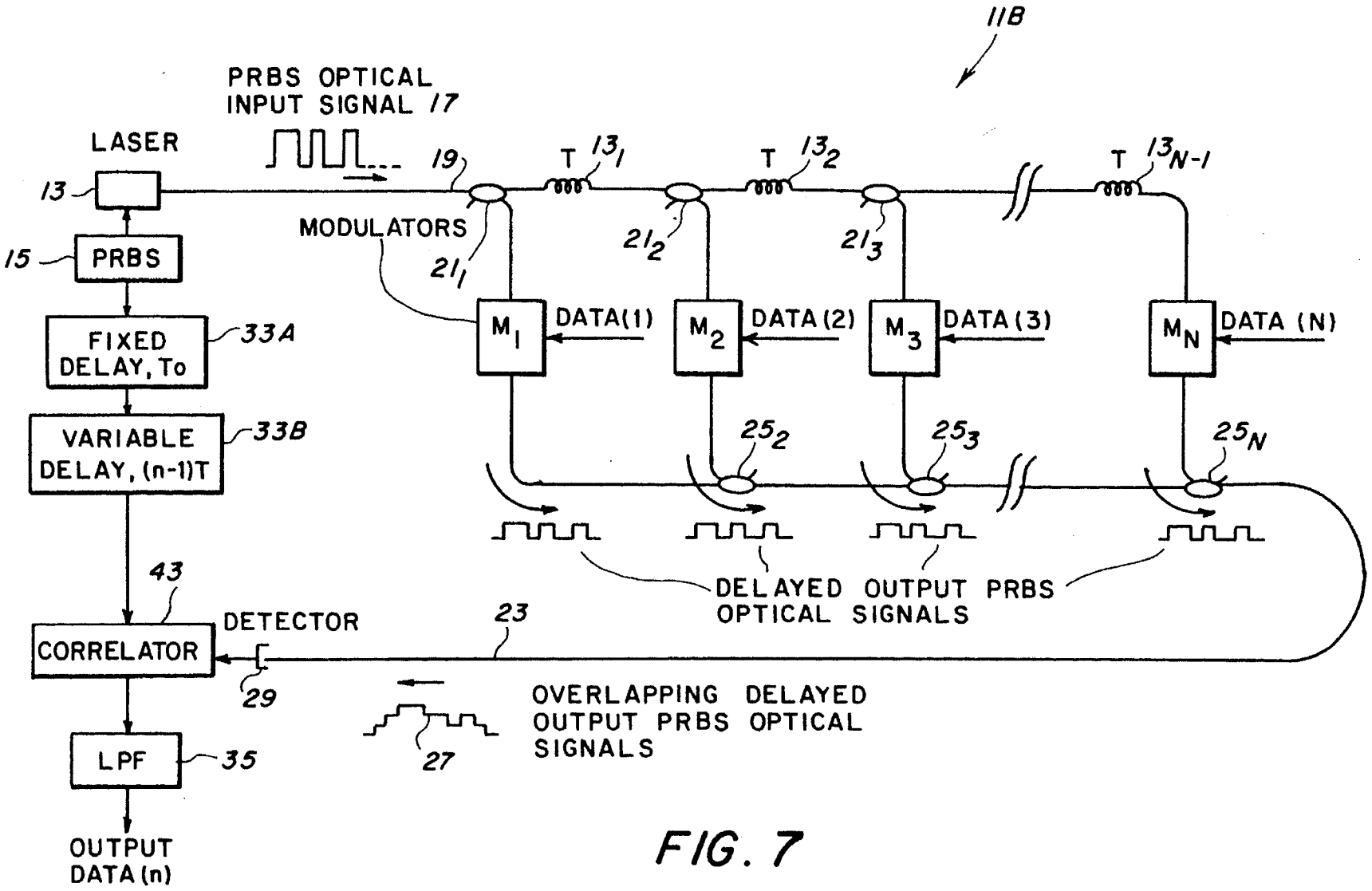
FIG. 7 illustrates a second embodiment of the invention.

FIG. 7 shows a second embodiment of the invention. FIG. 7 shows a modification of the circuitry of FIG. 5, wherein the sensors $SN_1$, $SN_2$, $SN_3$–$SN_N$ of FIG. 5 have been removed and replaced with modulators $M_1$, $M_2$, $M_3$–$M_N$, in FIG. 7; the adjustable delay circuit 33 in FIG. 5 has been replaced with a fixed delay circuit 33A (to account for the miscellaneous delays such as in the fibers 19 and 23) and a variable delay circuit 33B * t account for the delays of the delay coils $\mathbf{13}_1$, $\mathbf{13}_2$–$\mathbf{13}_{N-1}$; the modulator 41 in FIG. 5 has been removed in FIG. 7; and the PRBS generator 15 is directly coupled to the laser 13 in FIG. 7. The remaining structural elements in FIG. 7 are similar in structure and function to the corresponding elements in FIG. 5.

The modulators $M_1$, $M_2$, $M_3$—$M_N$ can be, for example, integrated optic modulators which would control the amount of light passing through the associated channels or branches of the ladder network 11B. The modulators $M_1$, $M_2$, $M_3$–$M_N$ are respectively driven by data signals data(1), data(2), and data(3)—data(N). These data signals can be, for example, voice signals or digital signals.

In operation, the PRBS optical signal 17 is launched into the input optical fiber 19 that is optically coupled to the array 11B. Portions of the PRBS optical signal 17 are fed into the modulators $M_1$–$M_N$ by way of associated fiber optic couplers $\mathbf{21}_1$, $\mathbf{21}_2$, $\mathbf{21}_3$ to $\mathbf{21}_{N-1}$ (not shown) in the array 11B, with each of the portions (except the portion into the modulator $M_1$) being delayed at the inputs to the modulators $M_2$–$M_N$ by the delay time T of each of the delay coils $\mathbf{13}_1$–$\mathbf{13}_{N-1}$ between the respective fiber optic couplers $\mathbf{21}_1$–$\mathbf{21}_{N-1}$. In other words, the portions of the PRBS optical signal that are fed to the modulators $M_2$–$M_N$ are each delayed by a multiple. $n_j$, of the bit period T, where j denotes a specific sensor ($1 \leqq j \leqq N$). However, it should be realized that the delay of each of the delay coils $\mathbf{13}_1$–$\mathbf{13}_{N-1}$ does not have to be one T, but can be any integer multiple of T (except zero).

The various data signals are respectively applied to the modulators $M_1$–$M_N$, causing the modulators $M_1$–$M_N$ to respectively modulate the amounts of light that pass therethrough. As a result, the output of each of the modulators $M_1$–$M_N$ is an delayed output PRBS optical signal which is encoded, or overmodulated, by the associated data signal applied thereto. These delayed PRBS optical signals from the modulators $M_1$–$M_N$ are selectively passed through fiber optic couplers $\mathbf{25}_2$–$\mathbf{25}_N$ to the output optical fiber 23. In the output optical fiber 23, the resultant series of delayed output PRBS optical signals combine and overlap with each other to produce a total output optical signal 27, which is comprised of the intensity sum of the overlapping delayed output PRBS optical signals. Each PRBS optical signal is a delayed PRBS sequence which is modified by its associated data signal. As a result, the total output optical signal 27 is a complex up-down staircase-like function.

The total output optical signal 27 is detected by the detector 29 to produce an equivalent electrical signal which is then applied to the correlator or correlation circuit 43. The same correlation signal processing occurs in FIG. 7 to obtain an output (data in the case) that occurred in FIG. 5, and hence no further description is required.

Figure 8:
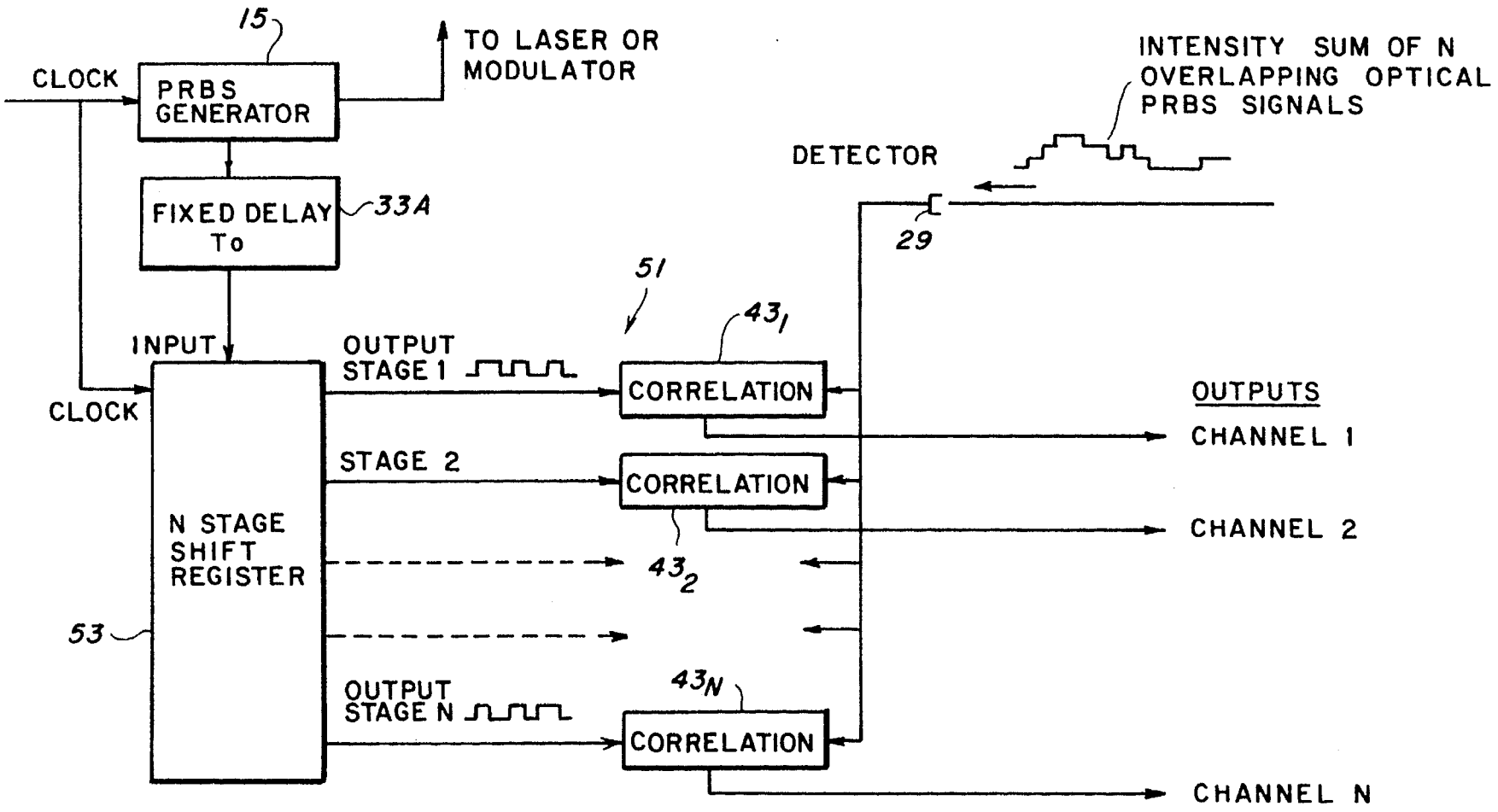
FIG. 8 illustrates a third embodiment of the invention.

The embodiments of FIGS. 5 and 7 of looking at one channel at a time. However, the third embodiment of FIG. 8 shows the implementation of a multi-stage correlation circuit 51, which is comprised of correlation circuits $\mathbf{43}_1$, $\mathbf{43}_2$-$\mathbf{43}_N$, each being similar in structure and operation to the correlation circuit 43 in FIG. 5 and 7. Each of the embodiments of FIGS. 5 and 7 could be modified in accordance with the teaching of FIG. 8 to provide multi-channel operation for sensor and communication channel signal processing. Note that the pseudo random bit sequence from the PRBS generator would be applied to the laser 13 in FIG. 5 for sensor operation or to the modulators $M_1$–$M_N$ in FIG. 7 for communications operation. The intensity sum of N overlapping optical PRBS signals to the detector 29 would be similar output for either the sensor operation of FIG. 5 or the communications operation of FIG. 7.

In the embodiment of FIG. 8, the pseudo-random bit sequence code from the PRBS code generator 15 is passed through the fixed delay circuit 33A before being applied to an N-stage shift register 53. The fixed delay circuit 33A provides a fixed delay to account for the miscellaneous delays such as in the fibers 19 and 23 that exist in the system of FIG. 8. The N-stage shift register 53 provides N differently delayed PRBS optical signals at respective output stages 1, 2-N, with each of the delayed PRBS optical signals having a delay of, for example, 1T greater than the previous delayed output to correspond to the delay of each of the delay coils $\mathbf{13}_1$–$\mathbf{13}_{N-1}$. Thus, the N-stage shift register 53 produces a series of outputs of the same PRBS, but delayed progressively by 1 bit, with eachone incremented by 1 bit of delay.

The series of differently delayed outputs of the PRBS code is respectively applied to the separate correlation circuits $\mathbf{43}_1$–$\mathbf{43}_N$, while at the same time the electrical signal from the detector 29 is also fed in parallel to the separate correlation circuits $\mathbf{43}_1$–$\mathbf{43}_N$. The outputs of the correlation circuits $\mathbf{43}_1$–$\mathbf{43}_N$ will simultaneously produce the outputs of channels 1 through N. So the embodiment of FIG. 8 can simultaneously develop all of the sensor signals of FIG. 5 or all of the outputs of the communications channels of FIG. 7.

Therefore, what has been described in preferred embodiments of the invention is a fiber optic network system for producing low crosstalk in sensor or communications appications by utilizing both spread spectrum and code division multiplexing techniques.

It should therefor readily be understood that many modifications and variations of the present invention are possible within the purview of the claimed invention. For example, the system described works with non return to zero (NRZ) pulse encoding of the input PRBS optical signal. Improved isolation can be achieved using reurn to zero (RZ) pulse encoding. It is therefore to be understood that, within the scope of the appended claims, the invention may be practiced otherwise than as specifically described.

What is claimed and desired to be secured by Letters Patent of the United States is:

1. A code-division multiplexed system comprising:

an optical source;

first means for developing and applying a pseudo-random bit sequence code to said optical source to cause said optical source to develop a unipolar coded optical signal;

means for dividing said unipolar coded optical signal into N optical paths separated from each other by associated successive integer multiples of a bit period T of delay;

N information signal sources for selectively encoding the unipolar coded optical signals in the respective N optical paths for producing N differently-delayed optical information signals;

means for combining said N differently-delayed optical information signals into an output optical signal comprised of an intensity sum of overlapping N differently-delayed unipolar optical information signals;

photodetection means responsive to said output optical signal for developing an input electrical signal corresponding to said sum of N overlapping unipolar optical information signals;

adjustable means responsive to said pseudo-random bit sequence code for producing at least one essentially bipolar reference code corresponding to the delay associated with an associated desired one of said N differently-delayed optical information signals; and correlation means responsive to said input electrical signal and to said at least one essentially bipolar reference code for synchronously correlating said at least one essentially bipolar reference code with said input electrical signal to extract a desired electrical signal corresponding to the desired one of said N differently-delayed optical information signals and to substantially suppress any other electrical signal that is asynchronously aligned with said at least one essentially bipolar reference code.

2. The system of claim 1 wherein:

said first means is a pseudo-random bit, maximal-length sequence code generator.

3. The system of claim 1 wherein said optical source includes:

a laser for emitting light; and a modulator responsive to light from said laser and to the pseudo-random bit sequence code for producing the unipolar coded optical signal.

4. The system of claim 1 wherein said correlation means includes:

a difference amplifier having inverting and non-inverting input terminals and an output terminal;

an electronic gate having a signal input for receiving said input electrical signal, first and second output terminals respectively coupled to said inverting and noninverting input terminals, and a control input for receiving said bipolar reference code, (said electonic gate being responsive to each positive state of said bipolar reference code for passing the unipolar electrical signal to said noninverting input terminal and to each negative state of said bipolar reference code for passing the unipolar electrical signal to said inverting input terminal,) said electronic gate operating to pass those portions of the unipolar electrical signal that are synchronously correlated with corresponding portions of said bipolar reference code to said noninverting input terminal and to pass all other portions of the unipolar electrical signal that are asynchronously correlated with corresponding portions of said bipolar reference code; and a low pass filter for filtering said output terminal of said difference amplifier for substantially filtering out any unwanted other electrical signal that is asynchronously aligned with said at least one essentially bipolar reference code.

5. The system of claim 1 wherein said correlation means includes:

a DC coupled analog multiplier for multiplying the input electrical signal with the desired reference code to produce a product signal; and a low pass filter responsive to the product signal for passing the desired electrical signal corresponding to the desired one of said N differently-delayed optical information signals and substantially suppressing all other unwanted signals contained in the product signal.

6. The system of claim 1 wherein:

said adjustable means includes a shift register with N tapped outputs respectively representative of said N optical paths, said shift register responsive to said pseudo-random bit sequence code for producing at associated ones of said N tapped outputs N differently-delayed bipolar reference codes corresponding to the delays associated with said N differently-delayed optical information signals.

7. A code-division multiplexed intensity based sensor array system comprising:

an optical source;

first means for developing and applying a pseudo-random bit sequence code to said optical source to cause said optical source to produce a unipolar coded optical signal;

an intensity based sensor array comprised of N sensors respectively disposed in N optical paths and being separated from each other by associated successive integer multiples of a bit period T of delay, said sensor array being responsive to said unipolar coded optical signal for producing N differently-delayed output optical signals respectively indicative of any changes in the physical parameters to which said N sensors are respectively responsive and for combining said N differently-delayed output optical signals into a unipolar output signal comprised of an intensity sum of overlapping N differently-delayed output optical signals;

photodetection means responsive to said unipolar output signal for developing a unipolar electrical signal corresponding to said unipolar output signal;

adjustable means responsive to said pseudo-random bit sequence code for producing at least one essentially bipolar reference code corresponding to the delay associated with an associated desired one of said N differently-delayed output optical signals; and correlation means responsive to said unipolar electrical signal and to said at least one essentially bipolar reference code for synchronously correlating said at least one essentially bipolar reference code with said unipolar electrical signal to extract a desird electical signal corresponding to the desired one of said N differently-delayed output optical signals and to substantially suppress any other electrical signal that is asynchronously aligned with said at least one essentially bipolar reference code.

8. A code-division multiplexed interferometric sensor array system comprising:

an optical source;

first means for developing and applying a pseudo-random bit sequence code to said optical source to cause said optical source to produce a unipolar coded optical signal;

an interferometric sensor array comprised of N sensors respectively disposed in N optical paths and being separated from each other by associated successive integer multiples of a bit period T of delay, said sensor array being responsive to said unipolar coded optical signal for producing N differently-delayed interferometric optical signals respectively indicative of any changes in the physical parameters to which said N sensors are respectively responsive and for combining said N differently-delayed interferometric optical signals into a unipolar output signal comprised of an intensity sum of overlapping N differently-delayed interferometric optical signals;

photodetection means responsive to said unipolar output signal for developing a unipolar electrical signal corresponding to said unipolar output signal;

adjustable means responsive to said pseudo-random bit sequence code for producing at least one essentially bipolar reference code corresponding to the delay associated with an associated desired one of said N differently-delayed interferometric optical signals; and correlation means responsive to said unipolar electrical signal and to said at least one essentially bipolar reference code for synchronously correlating said at least one essentially bipolar reference code with said unipolar electrical signal to extract a desird electical signal corresponding to the desired one of said N differently-delayed interferometric optical signals and to substantially suppress any other electrical signal that is asynchronously aligned with said at least one essentially bipolar reference code.

* * * * *